Aug. 15, 1961  D. RICHMAN  2,996,712
WAVE-SIGNAL DIRECTION-INDICATING APPARATUS
Filed May 5, 1951  3 Sheets-Sheet 1

FIG.1

INVENTOR.
DONALD RICHMAN
BY Lawrence B. Dodds
ATTORNEY

Aug. 15, 1961  D. RICHMAN  2,996,712
WAVE-SIGNAL DIRECTION-INDICATING APPARATUS
Filed May 5, 1951  3 Sheets-Sheet 2

*INVENTOR.*
DONALD RICHMAN
BY Laurence B. Dodds
ATTORNEY

FIG.2

2,996,712
WAVE-SIGNAL DIRECTION-INDICATING APPARATUS

Donald Richman, Flushing, N.Y., assignor to Hazeltine Research, Inc., Chicago, Ill., a corporation of Illinois
Filed May 5, 1951, Ser. No. 224,723
13 Claims. (Cl. 343—113)

General

The present invention relates to wave-signal direction-indicating apparatus and, more particularly, to such apparatus which provides an indication of the azimuth and the elevation angle of a wave signal intercepted thereby. While the invention is subject to a wide variety of applications, apparatus constructed in accordance with the invention has particular utility as direction-finding apparatus. Additionally, such apparatus may be utilized in a communication receiver and will be described in those environments.

Heretofore, some prior direction-finding apparatus has had the disadvantage of providing an erroneous indication of the azimuth of an intercepted wave signal under certain operating conditions. In such apparatus the azimuth indication depends on the elevation angle of the intercepted signal and the azimuth indication undesirably changes as variations in atmospheric conditions cause changes in the elevation angle.

In other prior direction-finding apparatus an ambiguous indication of azimuth is obtained and, hence, an additional sensing operation is required to resolve the ambiguity. Such apparatus has the disadvantage of requiring a sensing system which adds to the complexity and cost of the apparatus.

In another type of direction-finding apparatus two indications of the intercepted wave signal are provided on two phase-indicating devices and the azimuth of the intercepted signal may be derived from these indications by computations based thereon. It will be understood that the necessity of computing the azimuth of the intercepted signal from two separate indications renders operation of the apparatus more time consuming than may sometimes be desirable. Further, under conditions of multipath wave-signal transmission from a distant transmitter, the last-mentioned apparatus may undesirably provide an erroneous indication of the azimuth of the intercepted wave signal. Under such conditions of multipath wave-signal transmission, a pulse-modulated wave signal is propagated from a distant transmitter to the direction-finding apparatus over a plurality of different wave-signal propagation paths. Since the wave-signal propagation paths generally have different lengths, corresponding pulses of the wave signals propagated over different paths from the transmitter to the direction-finding apparatus ordinarily arrive at the direction-finding apparatus at slightly different times. During such operating conditions, because of the relatively slow response of the prior apparatus under consideration to the multiple wave signals, that apparatus does not provide a separate and accurate indication of each of the multiple signals. Accordingly, such prior direction-finding apparatus has not been entirely satisfactory for some applications in which there exist conditions of multipath wave-signal transmission.

Other direction-finding apparatus has been designed in the past accurately to indicate the azimuth and the elevation angle of individual ones of multiple wave signals by utilizing relatively complex antenna arrays having directional characteristics which render the apparatus capable of distinguishing individual ones of the multiple signals. Such direction-finding apparatus has the disadvantage of being more complex and, hence, more costly than is desirable for some applications.

It is an object of the present invention, therefore, to provide a new and improved wave-signal direction-indicating apparatus which avoids one or more of the above-mentioned disadvantages of prior such systems.

It is another object of the invention to provide a new and improved direction-finding apparatus which provides a readily comprehensible indication of the azimuth and the elevation angle of an intercepted wave signal.

It is a further object of the invention to provide a novel signal-separating apparatus which provides a separate indication of each of multiple pulse-modulated wave signals propagated from a distant transmitter to the apparatus over different wave-signal propagation paths.

It is still another object of the invention to provide a relatively simple direction-finding apparatus which provides a separate indication of the azimuth and the elevation angle of each of multiple pulse-modulated wave signals propagated from a distant transmitter to the apparatus over different wave-signal propagation paths.

In accordance with a particular form of the invention, a wave-signal direction-indicating apparatus comprises only three wave-signal interceptors for developing from a wave signal intercepted thereby three signals having relative phases representative of the phase gradients of the intercepted signal with reference to two non-opposite directions. The direction-indicating apparatus includes a cathode-ray tube coupled to the aforesaid interceptors and having a control electrode-cathode circuit and a display screen for providing thereon effectively a dot indication of the intercepted signal. The apparatus also includes a control circuit including the aforesaid control electrode-cathode circuit and coupled to only a first of the aforesaid interceptors and responsive to a first of the aforesaid three signals, a first control means for the cathode-ray tube coupled to only a second of the aforesaid interceptors and responsive to a second of the aforesaid three signals substantially simultaneously with the response of the above-mentioned control circuit and effective therewith to determine one co-ordinate of the aforesaid indication and a second control means for the cathode-ray tube coupled to only a third of the aforesaid interceptors and responsive to a third of the aforesaid three signals substantially simultaneously with the response of the above-mentioned control circuit and effective therewith to determine another co-ordinate of the above-mentioned indication. Also in accordance with the invention, a signal-separating apparatus for separating wave signals having approximately the same frequency and comprising modulated pulses of wave-signal energy which arrive at the apparatus at different times over different wave-signal propagation paths comprises a wave-signal intercepting system for developing from each of the wave signals intercepted thereby at least three signals having relative phases representative of the phase gradients of each intercepted signal with reference to at least two nonopposite directions. The apparatus includes display means coupled to the aforesaid system and including a single display area for providing thereon effectively a different dot indication of each intercepted signal. The display means also includes a control circuit responsive to at least a first of the aforesaid three signals developed from each intercepted signal, a first control means responsive to at least a second of the aforesaid three signals developed from each intercepted signal substantially simultaneously with the response of the above-mentioned control circuit and effective therewith to determine one co-ordinate of each of the aforesaid indications, and a second control means responsive to at least a third of the aforesaid said three signals developed from each intercepted signal substantially simultaneously with the response of the above-mentioned control circuit and effective therewith to determine another co-ordinate of each indication. The apparatus also includes a signal-translating channel coupled to the aforesaid intercepting system for translating a selected one of the aforesaid intercepted signals and for reproducing the modulation components thereof but normally maintained in a nontranslating condition. The apparatus additionally includes a gating-pulse generator circuit coupled to the aforesaid channel and responsive to the selected signal for conditioning the channel to translate the selected signal and reproduce the modulation components thereof.

For a better understanding of the present invention, together with other and further objects thereof, reference is had to the following description taken in connection with the accompanying drawings, and its scope will be pointed out in the appended claims.

In the accompanying drawings.

Figure 1:
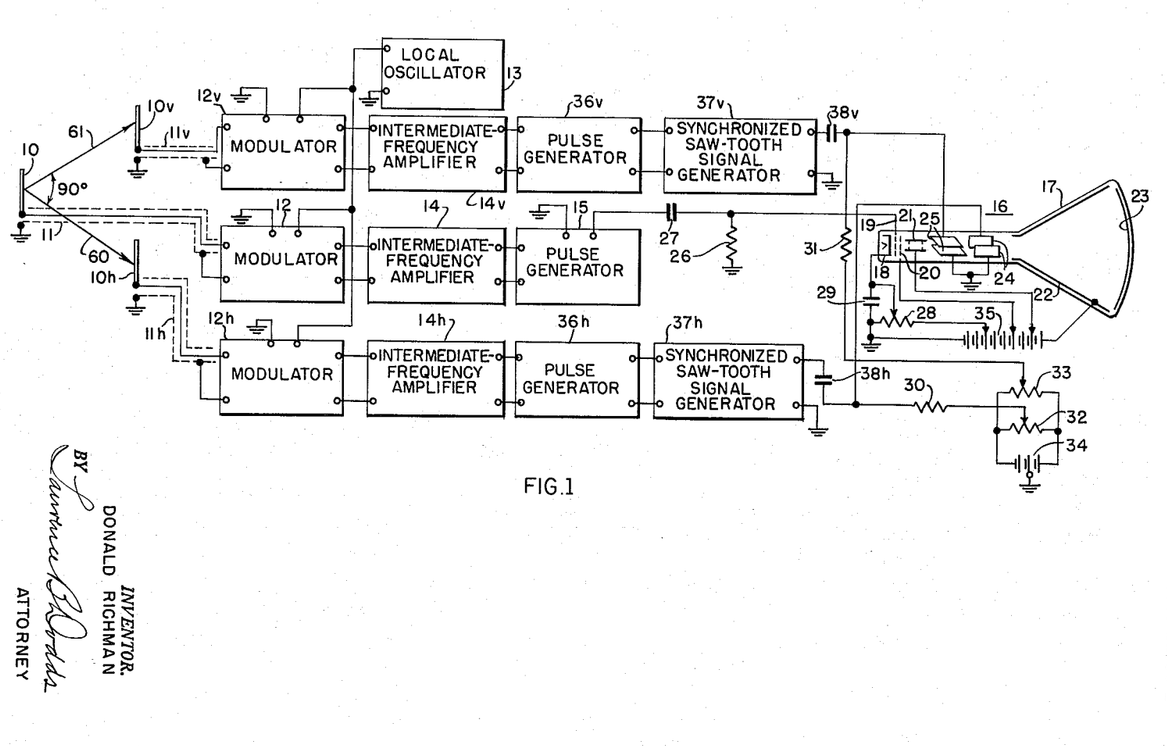
FIG. 1 is a circuit diagram, partly schematic, of a complete wave-signal direction-finding apparatus constructed in accordance with a particular form of the invention.

*Description of FIG. 1 direction-finding apparatus*

Referring now more particularly to FIG. 1 of the drawings, the direction-finding apparatus there represented comprises a wave-signal intercepting system, preferably including at least three wave-signal interceptors or antennas 10, 10h and 10v and the ground connections associated therewith, for developing from a wave signal intercepted by each of the antennas and which may be, for example, pulse-modulated, at least three signals having relative phases representative of the phase gradients of the intercepted signal with reference to at least two non-opposite directions. More particularly, the three antennas 10, 10h and 10v preferably are vertical, omnidirectional antennas positioned at the points of a right triangle on the ground plane. The two antennas 10h and 10v ordinarily are equally spaced from the other antenna 10 and are at a distance therefrom less than one-half the wave length of the intercepted signal. It will be understood that the two non-opposite directions referred to above are determined by the positions of the three antennas 10, 10h and 10v and may be considered as the directions indicated by a pair of perpendicular arrows 60 and 61 extending parallel to the ground plane from the antenna 10 to the antennas 10h and 10v as shown in FIG. 1.

By "phase gradient" of an intercepted signal with reference to a predetermined direction, it is meant the rate of change of phase of the intercepted signal in the predetermined direction. For example, in the FIG. 1 embodiment the phase gradient of an intercepted signal with reference to the direction indicated by the arrow 60 is represented by the quotient of the difference in the phases of the signals developed by the antennas 10 and 10h expressed in radians and the distance between those antennas expressed in radians. Similarly, the phase gradient of the intercepted signal with reference to the direction indicated by the arrow 61 is represented by the quotient of the difference in the phases of the signals developed by the antennas 10 and 10v and the distance between those antennas. In the FIG. 1 embodiment the phase differences and phase gradients just mentioned will be positive quantities if the signals developed by the antennas 10h and 10v have leading phases relative to the signal developed by the antenna 10. Conversely, the phase differences and phase gradients will be negative quantities if the signals developed by the antennas 10h and 10v have lagging phases relative to the signal developed by the antenna 10. It is well known that the phase differences between signals developed by spaced antennas, such as the antennas 10, 10h and 10v, depend on the azimuth and the elevation angle of the signal intercepted thereby. Accordingly, the phase gradient of an intercepted signal with reference to a predetermined direction is determined by the azimuth and the elevation angle of the intercepted signal.

The apparatus also includes display means for providing on a single display area effectively a dot indication of the intercepted signal, preferably representing the azimuth and the elevation angle thereof. The display means includes a control circuit responsive to at least a first of the three signals developed by the antennas 10, 10h and 10v. Specifically, the control circuit includes a transmission line 11 coupled between a first antenna 10 and one input circuit of a modulator 12 which has another input circuit coupled to a local oscillator 13 for applying a heterodyne wave signal thereto. The output circuit of the modulator 12 is coupled, in the order named, to an intermediate-frequency amplifier 14 and a pulse generator 15 for generating repetitive pulses synchronized with individual waves of each pulse of the intermediate-frequency signal derived by the modulator 12 from the first signal developed by the antenna 10. The radio-frequency section of the modulator is tuned to a frequency of, for example, ten megacycles and the intermediate-frequency amplifier ordinarily is tuned to a frequency of twenty kilocycles. In some cases it will be necessary, of course, to utilize additional modulator and intermediate-frequency stages in order to provide a suitable final intermediate-frequency signal. The pulse generator 15 may comprise a first double-diode limiter, an amplifier, a second double-diode limiter, a differentiating circuit and a rectifier, coupled in cascade, for providing a positive output pulse in response to each wave of an applied sinusoidal input signal, as described at pages 597–602 of the text "Radio Engineering," third edition, by F. E. Terman, published in 1947 by McGraw-Hill Book Company, Inc. The transmission line 11 and units 12–15, inclusive, may all be of conventional construction.

The control circuit also includes the control electrode-cathode circuit of a cathode-ray tube 16 which preferably is maintained in a normally nonconductive condition. The cathode-ray tube 16 may be of conventional construction and comprises the usual envelope 17 containing, in the order named, a cathode 18, a control electrode 19, accelerating and focusing electrodes 20, 21, a second anode 22 and the usual fluorescent display screen 23 at the end of the tube. The usual pairs of beam-deflection electrodes 24, 24 and 25, 25, subsequently to be considered in greater detail, are disposed within the neck of the tube for deflecting the cathode-ray beam thereof along each of a pair of co-ordinate axes on the screen. The control electrode 19 of the cathode-ray tube 16 is coupled through a grid-leak resistor 26 and a coupling condenser 27 to the output circuit of the pulse generator 15 for periodically rendering the cathode-ray tube 16 conductive in response to an output signal from unit 15 to develop the above-mentioned dot indication on the screen 23 of the tube. The cathode 18 of the tube 16 has an operating bias applied thereto through a selectable portion of a voltage divider 28 which is coupled across a portion of a source of potential represented as a battery 35. The selectable voltage-divider portion is by-passed by an intermediate-frequency signal by-pass condenser 29. The beam-deflection electrodes 24, 24 and 25, 25 are coupled through resistors 30 and 31, respectively, to horizontal and vertical beam-centering controls comprising voltage dividers 32 and 33 coupled across a suitable source such as a battery 34 which is center-tapped to ground. Operating potentials for the other electrodes of the cathode-ray tube 16 are supplied from a suitable source such as the battery 35.

Figure 1A:
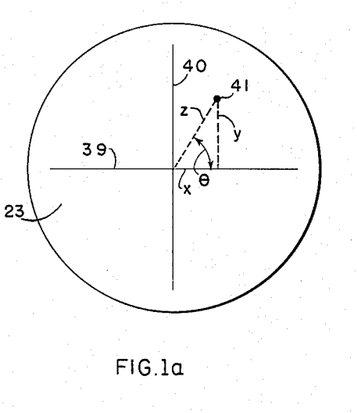
FIG. 1a is a diagram representing a portion of the FIG. 1 apparatus utilized in explaining the operation thereof.

Referring for the moment to FIG. 1a, the display screen 23 is there represented as having thereon a pair of perpendicular co-ordinate axes 39 and 40. The co-ordinate axes, of course, ordinarily are located on a transparent screen in front of the face of the cathode-ray tube 16. A spot or dot indication 41 is represented on the screen 23 as having a displacement $x$ from the center of the screen along the horizontal axis 39. A dashed line $y$ represents the vertical displacement of the dot indication 41 from the center of the screen 23 and a dashed line $z$ represents the resultant displacement of the dot indication 41 from the center of the screen. Notice that the displacements $x$, $y$ and $z$ of the dot indication 41 form a right triangle. It will be understood, of course, that the dashed lines $y$ and $z$ do not appear on the display screen but are merely shown to aid in the description. For convenience, the angular displacement of the dot indication from the horizontal axis 39 is designated $\theta$.

Referring again to FIG. 1, the display means also includes a first control means for the cathode-ray tube 16 responsive to at least a second of the three signals developed from the intercepted signal by the wave-signal intercepting system substantially simultaneously with the response of the control circuit to the first of the three signals and effective with the control circuit to determine one co-ordinate of the aforesaid indication. The first control means is coupled, in the order named, to a second of the antennas, namely the antenna 10h, and comprises a transmission line 11h, a modulator 12h, an intermediate-frequency amplifier 14h, a pulse generator 36h and a synchronized saw-tooth signal generator 37h coupled by a direct-current blocking condenser 38h to the beam-deflection electrodes 24, 24. This control means also includes the local oscillator 13 which is coupled to an input circuit of the modulator 12h for applying thereto the same heterodyne signal as applied to the modulator 12. The transmission line 11h and units 12h and 14h are generally similar to the corresponding elements of the control circuit described above. The pulse generator 36h is generally similar to the pulse generator 15 but is constructed as described at the above-mentioned pages of the Terman text to provide negative output pulses in response to an applied sinusoidal input signal. The synchronized saw-tooth signal generator 37h may be of conventional construction and together with the beam-deflection electrodes 24, 24 is included in a beam-deflection circuit for deflecting the cathode-ray beam of the tube 16 along a horizontal axis on the display screen 23.

The display means additionally includes a second control means for the cathode-ray tube 16 responsive to at least a third of the above-mentioned three signals substantially simultaneously with the response of the control circuit to the first of the three signals and effective therewith to determine another co-ordinate of the aforesaid indication. The second control means is coupled to a third of the antennas, namely the antenna 10v, and comprises a transmission line 11v, a modulator 12v, an intermediate-frequency amplifier 14v, a pulse generator 36v, a synchronized saw-tooth signal generator 37v, a condenser 38v, which preferably are of the same construction as the corresponding elements of the first control means, and the beam-deflection electrodes 25, 25. The second control means also includes the local oscillator 13 which is coupled to an input circuit of the modulator 12v for applying thereto the same heterodyne signal as applied to the modulators 12 and 12h. The synchronized saw-tooth signal generator 37v and the beam-deflection electrodes 25, 25 are included in a beam-deflection circuit for deflecting the electron beam of the tube 16 along a vertical axis on the display screen.

The three wave-signal translating circuits coupled between the antennas 10, 10h and 10v and the pulse generators 15, 36h and 36v, respectively, preferably are constructed to provide equal time delays in the translation of the above-mentioned three signals from the antennas to the pulse generators. The transmission lines 11, 11h and 11v, therefore, ordinarily have the same electrical lengths and the time delays provided by corresponding amplifiers in the three signal-translating circuits ordinarily are the same. Additionally, the amplification characteristics of corresponding amplifiers in the three circuits ordinarily are the same.

Operation of FIG. 1 direction-finding apparatus

In considering the operation of the apparatus just described, for convenience it will be assumed initially that a pulse-modulated signal is transmitted from a distant transmitter to the direction-finding apparatus over a single wave-signal propagation path of unknown azimuth and elevation angle. The transmitted signal may, for example, have a carrier frequency of the order of 10 megacycles, a pulse-repetition frequency of approximately 250 cycles per second and a pulse duration of approximately 2000 microseconds.

The transmitted signal is intercepted at slightly different times by the three antennas 10, 10h, and 10v because of the spacings therebetween and the three antennas develop from the intercepted signal three signals having relative phases representatives of the phase gradients of the intercepted signal with reference to the directions indicated by the arrows 60 and 61 in FIG. 1. As mentioned, previously, the phase gradients are determined by the azimuth and the elevation angle of the intercepted signal. The three signals developed by the antennas 10, 10h and 10v are applied by the transmission lines 11, 11h and 11v to the input circuits of the modulators 12, 12h and 12v, respectively, wherein those signals beat with the heterodyne wave signal applied to the modulators 12, 12h and 12v by the local oscillator 13 to provide three intermediate-frequency signals in the output circuits of the modulators. The intermediate-frequency amplifiers 14, 14h and 14v then amplify the intermediate-frequency signals just mentioned and apply the amplified signals to the pulse generators 15, 36h and 36v, respectively.

Since the three transmission lines, the three modulators and the three intermediate-frequency amplifiers are constructed to provide equal time delays in the transmission of signals from the antennas 10, 10h and 10v to the pulse generators 15, 36h and 36v, respectively, the relative phases of the intermediate-frequency signals applied to the three pulse generators are the same as the relative phases of the three signals developed by the antennas 10, 10h and 10v.

Figure 2:
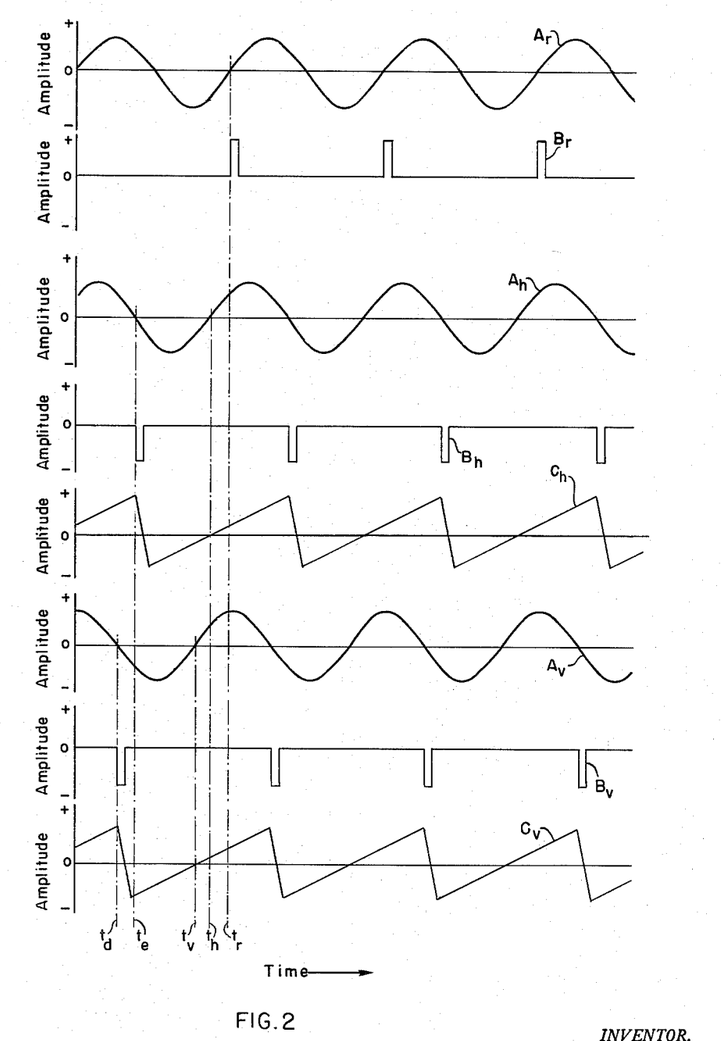
FIG. 2 is a graph utilized in explaining the operation of the FIG. 1 apparatus.

At this point, the operation of the direction-finding apparatus represented in FIG. 1 and the results obtained thereby may be best understood by reference to FIG. 2 of the drawings. The graph of FIG. 2 represents the amplitude-time characteristics of the output signals of several units of the apparatus. Portions of the three intermediate-frequency signals applied to the pulse generators 15, 36h and 36v are represented in FIG. 2 by curves $A_r$, $A_h$ and $A_v$, respectively. The signals represented by these curves, therefore, have relative phases determined by the azimuth and the elevation angle of the intercepted signal.

Through a well-known pulse-generating operation and in response to the signal represented by curve $A_r$, the pulse generator 15 develops in its output circuit the signal represented by curve $B_r$ of FIG. 2. It may be seen from curve $B_r$ that the pulse generator 15 develops a positive pulse each time the amplitude of the signal represented by curve $A_r$ passes through zero from a negative to a positive value. These positive pulses, which are applied by the pulse generator 15 to the control electrode 19 of the cathode-ray tube 16, have amplitudes sufficient to render the cathode-ray tube 16 conductive for the duration of the pulses. The first of the pulses occurs at the time $t_r$ and, hence, the cathode-ray tube 16 is rendered conductive at that time and periodically thereafter.

Similarly, in response to the signals represented by curves $A_h$ and $A_v$, the pulse generators 36h and 36v develop in the output circuits thereof the signals represented in curves $B_h$ and $B_v$, respectively. Each of the last-mentioned signals comprises negative pulses occurring each time the amplitude of the input signal to the generator of the pulses passes through zero from a positive to a negative value. The first of the pulses of curve $B_h$ occurs at a time $t_e$ while the corresponding pulse of curve $B_v$ occurs at a time $t_d$.

The pulses represented by curves $B_h$ and $B_v$ are applied by the pulse generators $36h$ and $36v$ to the saw-tooth signal generators $37h$ and $37v$, respectively, to initiate the retrace portions of the output signals thereof which are represented by curves $Ch$ and $Cv$, respectively. The output signals of the saw-tooth signal generators $37h$ and $37v$ have relatively short retrace portions and, accordingly, have trace portions of approximately the same duration as the period of an intermediate-frequency signal. As represented by curves $Ch$ and $Cv$, these output signals preferably are substantially balanced with reference to ground.

The coupling condensers $38h$ and $38v$ apply the output signals of the saw-tooth signal generators $37h$ and $37v$ to the beam-deflection electrodes 24, 24 and 25, 25, respectively, to control the positioning of the indication of the intercepted signal on the display screen 23.

It will be understood that at the time $t_r$ when the cathode-ray tube is rendered conductive for the duration of the first pulse of curve $B_r$, the instantaneous amplitudes of the signals applied to the beam-deflection electrodes 24, 24 and 25, 25 determine the co-ordinates of the dot indication on the display screen 23. Since the signals represented by curves $A_r$, $A_h$ and $A_v$ have constant phase relations under the assumed operating conditions, when the cathode-ray tube 16 is rendered conductive by subsequent pulses of curve $B_r$ the signals applied to the beam-deflection electrodes have the same instantaneous amplitudes as at the time $t_r$ just considered. Accordingly, the indication of the intercepted signal successively occurs at the same position on the display screen and the persistence of the fluorescent screen, therefore, is sufficient to provide a continuous indication.

More readily to comprehend the determination of the co-ordinates of the indication, consider again for the moment that the signals represented by curves $A_r$, $A_h$ and $A_v$ have relative phases determined by the azimuth and the elevation angle of the intercepted signal. Then assuming for convenience that the amplitudes of the signals developed by the three antennas are substantially equal as is the usual case, the amplitude-time characteristics of the three intermediate-frequency signals may be expressed in the following manner:

$$e_r = E \sin(\omega t + \phi) \quad (1)$$

$$e_h = E \sin(\omega t + \phi + R \cos \alpha \cos \epsilon) \quad (2)$$

$$e_v = E \sin(\omega t + \phi + R \sin \alpha \cos \epsilon) \quad (3)$$

where $e_r$, $e_h$ and $e_v$ = instantaneous amplitudes of the respective signals represented by curves $A_r$, $A_h$ and $A_v$ at a time $t$
$E$ = maximum amplitude of each of the signals represented by curves $A_r$, $A_h$ and $A_v$
$\omega$ = angular frequency of the signals represented by curves $A_r$, $A_h$ and $A_v$
$\phi$ = instantaneous phase of the signal represented by curve $A_r$ at a reference time $t_r$
$R$ = distance in radians at the intercepted signal frequency between the antennas 10 and $10h$ and between the antennas 10 and $10v$
$\alpha$ = azimuth of the intercepted signal
$\epsilon$ = elevation angle of the intercepted signal.

It will be seen from FIG. 2 that for convenience the reference time $t_r$ has been chosen as the time when the amplitude of the signal represented by curve $A_r$ is zero at the beginning of the new intermediate-frequency cycle. Thus, $t_r$ is so chosen that:

$$\phi = 0 \quad (4)$$

Since $t_r$ is the reference time, the time $t_r$ may be expressed as:

$$t_r = 0 \quad (5)$$

Thus, by substituting Equations 4 and 5 in each of Equations 2 and 3, it will be seen that at the time $t_r$ the amplitudes of the signals represented by curves $A_h$ and $A_v$ may be expressed by the following equations:

$$e_h = E \sin(R \cos \alpha \cos \epsilon) \quad (6)$$

$$e_v = E \sin(R \sin \alpha \cos \epsilon) \quad (7)$$

Accordingly, the phases of the signals represented by curves $A_h$ and $A_v$ at the time $t_r$ may be written:

$$\phi_h = R \cos \alpha \sin \epsilon \quad (8)$$

$$\phi_v = R \sin \alpha \sin \epsilon \quad (9)$$

where $\phi_h$ and $\phi_v$ = instantaneous phases of the respective signals represented by curves $A_h$ and $A_v$ at the time $t_r$.

It will be seen from FIG. 2 that the amplitudes of signals represented by curves $A_h$ and $A_v$ pass through zero from a negative to a positive value at times $t_h$ and $t_v$, respectively, prior to the reference time $t_r$. Accordingly, the phase difference between the signals represented by curves $A_h$ and $A_r$ is represented by the difference between the phase of the signal represented by curve $A_h$ at the time $t_r$ and the phase of that signal at the time $t_h$, or, in other words, by the instantaneous phase of the signal represented by curve $A_h$ at the time $t_r$. From Equation 8 it will be seen that this relation may be expressed in the following manner:

$$\omega(t_r - t_h) = R \cos \alpha \cos \epsilon \quad (10)$$

Accordingly:

$$t_r - t_h = \frac{R \cos \alpha \cos \epsilon}{\omega} \quad (11)$$

Similarly from Equation 9 it may be shown that:

$$t_r - t_v = \frac{R \sin \alpha \cos \epsilon}{\omega} \quad (12)$$

With the centering controls 32 and 33 so adjusted that the center of the display screen 23 is a reference point, then the displacement of the cathode-ray beam from the center of the screen along the horizontal axis 39 on the face of the screen at the time $t_r$ may be expressed as follows:

$$x = K(t_r - t_h) \quad (13)$$

where $x$ = displacement of the cathode-ray beam from the center of the display screen 23
$K$ = a constant determined by the construction of the cathode-ray tube, the operating potentials applied thereto and the amplitude of the signal developed by the saw-tooth signal generator $37h$.

Accordingly, substituting Equation 11 in Equation 13:

$$x = \frac{KR}{\omega} \cos \alpha \cos \epsilon \quad (14)$$

Similarly, since the saw-tooth signal generator $37v$ is constructed to provide an output signal equal in amplitude to the output signal of saw-tooth signal generator $37h$ and since the horizontal and vertical deflection electrodes are similarly constructed, it follows from Equation 12 that:

$$y = \frac{KR}{\omega} \sin \alpha \cos \epsilon \quad (15)$$

where $y$ = displacement of the cathode-ray beam from the center of the display screen 23.

The resultant displacement of the dot indication from the center of the display screen 23 will be readily apparent from FIG. 1a of the drawings. As noted previously, the displacements x, y and z indicated thereon form a right triangle. Hence from Equations 14 and 15 it will be seen that:

$$\theta = \alpha \qquad (16)$$

$$z = \frac{KR}{\omega} \cos \epsilon \qquad (17)$$

Accordingly, by suitably calibrating the display screen 23 in terms of $\alpha$ and $\epsilon$, the azimuth and elevation angle of the intercepted signal may be read directly therefrom. As seen above, the azimuth is indicated by the angular displacement $\theta$ of the dot indication 41 from the horizontal axis 39 and the elevation angle is indicated by the displacement $z$ of the dot indication 41 from the center of display screen 23. In other words, the quotient of the coordinates $x$, $y$ of the indication is proportional to the tangent of the azimuth and thus is functionally representative of the azimuth while the magnitude of the displacement $z$ is proportional to the cosine of the elevation angle and thus is functionally representative of the elevation angle.

In considering the operation of the direction-finding apparatus as thus far explained, it has been assumed that a pulse-modulated signal is transmitted from a distant transmitter to the direction-finding apparatus over a single wave-signal propagation path. It is well known in the art, however, that because of the nature of ionospheric wave-signal propagation, signals will usually be transmitted over a plurality of propagation paths from the transmitter to the direction-finding apparatus. Since these paths usually have different lengths, the transmitted signals ordinarily arrive at the direction-finding apparatus at slightly different times. Consider for example that pulse-modulated signals are transmitted over two wave-signal propagation paths from the transmitter to the direction-finding apparatus and that pulses of these wave signals are intercepted by the direction-finding apparatus at slightly different times, portions of corresponding pulses being simultaneously intercepted. It will be understood, therefore, that during a first time interval only a pulse of the signal which first arrives at the direction-finding apparatus is intercepted thereby. During a second time interval pulses of both signals are intercepted by the apparatus, and during a third time interval only a pulse of the second signal to arrive at the apparatus is intercepted thereby.

During the first and third time intervals when pulses of the individual signals are singly intercepted, the direction-finding apparatus provides effectively a different dot indication of each of the intercepted signals similar to the dot indication 41 in FIG. 1a. During the second time interval when pulses of both signals are intercepted, because of the continuously varying conditions of ionospheric wave-signal transmission, the amplitudes and phases of the intercepted signals change relative to each other. Hence, during the time interval when pulses of both signals are intercepted, the indication of azimuth and elevation angle caused by the combination of the two signals continuously changes. This causes a faint line usually in the form of an ellipse to appear on the screen 23 of the cathode-ray tube 16 of FIG. 1 between the two dot indications of the azimuth and elevation angle of the two intercepted signals. Since each of the two dot indications repetitively occurs at substantially the same position on the display screen 23 as explained above, the dot indications will usually appear more brightly on the display screen than the faint line mentioned above. Knowledge of ionospheric wave-signal transmission conditions will then enable an observer to ascertain which is the most accurate indication of the direction of the distant transmitter. For example, some ionospheric investigations have indicated that the signal having the lowest elevation angle most accurately indicates the direction of the distant transmitter. Thus, it will be seen that the direction-finding apparatus is also effective as a signal-separating apparatus to provide separate indications of pulse-modulated signals arriving at the apparatus over different wave-signal propagation paths.

In the event that noise interferes with the reception of the signals, a cluster of dot indications, which effectively is a single dot indication, will ordinarily appear on the display screen 23 as representative of each intercepted signal. In such a case, the position of the center of each cluster approximately indicates the azimuth and elevation angle of each intercepted signal.

Figure 1B:
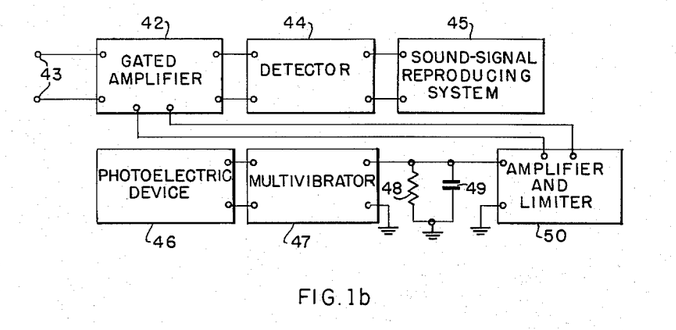
FIG. 1b is a schematic diagram of a circuit which may be utilized in conjunction with the FIG. 1 apparatus in a communication receiver constructed in accordance with another form of the invention.

Description of Fig. 1b apparatus

Referring now more particularly to FIG. 1b of the drawings, the apparatus there represented may be utilized in conjunction with the FIG. 1 apparatus in a communication receiver for receiving wave signals of a pulse-modulated type, for example, pulse amplitude-modulated wave signals. For this application of the FIG. 1 apparatus, the fluorescent display screen 23 of the cathode-ray tube 16 preferably has a short persistence. The FIG. 1 apparatus is otherwise substantially the same as previously described. The FIG. 1b apparatus comprises a signal-translating channel coupled to the aforesaid intercepting system of the FIG. 1 apparatus for translating a selected one of the intercepted signals and for reproducing the modulation components thereof but normally maintained in a nontranslating condition. More particularly, this channel includes a repeater or gated amplifier 42 of well-known construction, such as an amplifier of the type represented and described at page 379 of the text entitled "Waveforms" in the Massachusetts Institute of Technology Radiation Laboratory Series, edited by Chance, Hughes, MacNichol, Sayre and Williams, and published in 1949 by the McGraw-Hill Book Company, Inc. The gated amplifier 42 has a pair of input terminals 43, 43 which are ordinarily coupled to a first control electrode-cathode circuit of the amplifier and are adapted for connection to the output circuit of an intermediate-frequency amplifier, such as the amplifier 14 in the FIG. 1 embodiment, during the operation of that apparatus as part of the communication receiver. The output circuit of the amplifier 42 is coupled to a suitable detector 44 for deriving the modulation components of the received pulse amplitude-modulated wave signal. The detector 44 is in turn coupled to a conventional sound-signal reproducing system 45.

The FIG. 1b apparatus also includes a gating-pulse generator circuit coupled to the above-mentioned channel and responsive to the selected signal for conditioning the channel to translate the selected signal and reproduce the modulation components thereof. More particularly, the gating-pulse generator circuit comprises a photoelectric device 46 which may include a phototube and a suitable amplifier circuit, such as a high-frequency booster circuit commonly used in the television art. The phototube is adapted for mounting on or adjacent the face of the cathode-ray tube 16 and during the operation of the communication receiver is so located at a particular position adjacent the face of the cathode-ray tube as to be responsive to the dot indication of the selected signal. The output circuit of the photoelectric device 46 is coupled to a multivibrator 47 which may be a so-called "one-shot" multivibrator as described at page 590 of the above-mentioned Terman text. A resistor-condenser network 48, 49 and an amplifier and limiter 50 are coupled to the output circuit of the multivibrator 47 to provide suitable wave shaping of the output signal thereof. The resistor-condenser network preferably has a time constant which is long with respect to the period of an intermediate-frequency signal. The output circuit of the amplifier and limiter 50 is coupled to a second input circuit of the gated amplifier 42, such as a suppressor electrode-cathode circuit.

Operation of FIG. 1b apparatus

In considering the operation of the FIG. 1b apparatus just described, it will be assumed initially that a pulse amplitude-modulated signal is transmitted from a distant transmitter to the apparatus over a plurality of wave-signal propagation paths and that corresponding pulses of these wave signals are intercepted by the apparatus at slightly different times. The transmitted signal may, for example, have a carrier frequency of the order of 10 megacycles, a pulse-repetition frequency of approximately 250 cycles per second and a pulse duration of approximately 250 microseconds. It will also be assumed that the input terminals 43, 43 of the gated amplifier 42 are connected to the output circuit of the intermediate-frequency amplifier 14 and that the phototube of the photoelectric device 46 is adjustably mounted adjacent the face of the cathode-ray tube 16.

It will be understood that conditions of multipath transmission of signals from a transmitter to a communication receiver ordinarily cause undesirable fading effects because of interference between pulses of the signals transmitted over different wave-signal propagation paths. It will presently be seen that the apparatus just described is effective to reduce the extent of such fading effects.

The FIG. 1 apparatus functions as a signal-separating apparatus to separate signals transmitted over a plurality of wave-signal propagation paths in the manner previously explained and thus provides a different dot indication of each of those signals on the display screen 23 of the cathode-ray tube 16. The phototube of the photoelectric device 46 then is so positioned adjacent the face of the cathode-ray tube 16 as to respond only to the dot indication of a selected one of the intercepted signals. Since pulses of the cathode-ray beam occur at the intermediate frequency while providing the dot indication of the selected signal, the intensity of this indication varies at the intermediate frequency. Accordingly, the photoelectric device 46 provides in its output circuit pulses of short duration which recur at the intermediate frequency and are representative of the cathode-ray beam pulses.

Each pulse of the output signal of the device 46 triggers the multivibrator 47 to provide in the output circuit thereof a pulse of duration slightly less than the period of an intermediate-frequency signal. The resistor-condenser network 48, 49 causes the trailing edge of each such pulse in the output circuit of the multivibrator 47 to overlap the leading edge of each succeeding pulse. Accordingly, in response to a series of output pulses from the multivibrator 47 occurring at the intermediate frequency, the resistor-condenser network 48, 49 forms a single serrated pulse. This serrated pulse is applied to the input circuit of the amplifier and limiter 50 which limits the amplitude of that pulse to form a rectangular gating pulse. The gating pulse is applied by the amplifier and limiter 50 to an input circuit of the gated amplifier 42 to condition the amplifier 42 to translate the signal applied to the input terminals 43, 43 thereof during the gating interval. It will be seen that the signal applied to the terminals 43, 43 during the gating interval is an intermediate-frequency pulse corresponding to a pulse of the selected signal. Accordingly, intermediate-frequency pulses representative of the selected signal are amplified by the amplifier 42 and are applied to the detector 44 which derives the modulation components thereof. These modulation components are in turn applied to the sound-signal reproducing system 45 which converts the modulation components to sound in the usual manner.

During intervals when pulses of more than one signal are simultaneously intercepted by the intercepting system of the FIG. 1 apparatus, the cathode-ray beam of the tube 16 causes indications at different positions on the display screen 23 of the cathode-ray tube 16 as previously explained. Hence, the photoelectric device 46 which is responsive only to the dot indication of the selected signal at a particular position on the display screen 23 does not then provide any output pulses. Consequently, under such operating conditions no gating pulse is applied to the amplifier 42 and that amplifier remains in a nontranslating condition. Accordingly, signals transmitted over different wave-signal propagation paths which would otherwise distort the modulation components derived from the selected signal are not translated to the detector 44 and, therefore, undesirable fading effects are substantially reduced.

Other embodiments of the invention will be apparent to those skilled in the art. In one such embodiment the pulse generators 36h and 36v and the saw-tooth signal generators 37h and 37v of FIG. 1 may be omitted and the output circuits of the intermediate-frequency amplifiers 14h and 14v may be directly connected to the condensers 38h and 38v. In such an embodiment sinusoidal signals are applied to the beam-deflection electrodes 24, 24 and 25, 25. Consequently, the dot indications of the intercepted signals will provide an approximate indication of the azimuth and elevation angles thereof unless the scale placed over the display screen 23 is suitably calibrated to compensate nonlinearities in the displacements of the dot indications introduced in the apparatus by the application of sinusoidal signals to the beam-deflection electrodes.

From the foregoing description, it will be seen that a direction-indicating apparatus embodying the invention has the advantage that the apparatus provides a readily comprehensible indication of the azimuth and the elevation angle of each of the multiple pulse-modulated wave signals propagated from a distant transmitter to the apparatus over different wave-signal propagation paths.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal direction-indicating apparatus comprising: only three wave-signal interceptors for developing from a wave signal intercepted thereby three signals having relative phases representative of the phase gradients of said intercepted signal with reference to two non-opposite directions; a cathode-ray tube coupled to said interceptors and having a control electrode-cathode circuit and a display screen for providing thereon effectively a dot indication of the azimuth and the elevation angle of said intercepted signal; a control circuit including said control electrode-cathode circuit and coupled to only a first of said interceptors and responsive to a first of said three signals; a first control means for said cathode-ray tube coupled to only a second of said interceptors and responsive to a second of said three signals substantially simultaneously with the response of said control circuit and effective therewith to determine one co-ordinate of said indication; and a second control means for said cathode-ray tube coupled to only a third of said interceptors and responsive to a third of said three signals substantially simultaneously with the response of said control circuit and effective therewith to determine another co-ordinate of said indication.

2. A wave-signal direction-indicating apparatus comprising: only three wave-signal interceptors for developing from a wave signal intercepted thereby three signals having relative phases representative of the phase gradients of said intercepted signal with reference to two non-opposite directions; a cathode-ray tube coupled to said interceptors and having a control electrode-cathode circuit and a display screen for providing thereon effectively a dot indication of the azimuth and the elevation angle of said intercepted signal; a control circuit including said control electrode-cathode circuit and coupled to only a first of said interceptors and responsive to a first of said three signals; a first control means for said cathode-ray tube coupled to only a second of said interceptors and responsive to a second of said three signals substantially simultaneously with the response of said control circuit and effective therewith to determine one co-ordinate of said indication with respect to a pair of intersecting co-ordinate axes on said screen; and a second control means for said cathode-ray tube coupled to only a third of said interceptors and responsive to a third of said three signals substantially simultaneously with the response of said control circuit and effective therewith to determine another co-ordinate of said indication with respect to said pair of co-ordinate axes, the quotient of the co-ordinates of said indication being functionally representative of said azimuth and the magnitude of the displacement of said indication from the intersection of said axes being functionally representative of said elevation angle.

3. A wave-signal direction-indicating apparatus comprising: only three wave-signal interceptors for developing from a wave signal intercepted thereby three signals having relative phases representative of the phase gradients of said intercepted signal with reference to two non-opposite directions; a cathode-ray tube coupled to said interceptors and having a control electrode-cathode circuit and a display screen for providing thereon effectively a dot indication of the azimuth and the elevation angle of said intercepted signal; a control circuit including said control electrode-cathode circuit and coupled to only a first of said interceptors and responsive to a first of said three signals; a first control means for said cathode-ray tube coupled to only a second of said interceptors and responsive to a second of said three signals substantially simultaneously with the response of said control circuit and effective therewith to determine one co-ordinate of said indication; and a second control means for said cathode-ray tube coupled to only a third of said interceptors and responsive to a third of said three signals substantially simultaneously with the response to said control circuit and effective therewith to determine another co-ordinate of said indication, said one co-ordinate of said indication being proportional to cos α cos ε and said other co-ordinate being proportional to sin α cos ε where α represents said azimuth and ε represents said elevation angle.

4. A wave-signal direction-indicating apparatus comprising: only three wave-signal interceptors positioned at the points of a right triangle for developing from a wave signal intercepted by each thereof three signals having relative phases representative of the phase gradients of said intercepted signal with reference to two non-opposite directions; a cathode-ray tube coupled to said interceptors and having a control electrode-cathode circuit and a display screen for providing thereon effectively a dot indication of said intercepted signal; a control circuit including said control electrode-cathode circuit and coupled to only a first of said interceptors and responsive to a first of said three signals; a first control means for said cathode-ray tube coupled to only a second of said interceptors and responsive to a second of said three signals substantially simultaneously with the response of said control circuit and effective therewith to determine one co-ordinate of said indication; and a second control means for said cathode-ray tube coupled to only a third of said interceptors and responsive to a third of said three signals substantially simultaneously with the response of said control circuit and effective therewith to determine another co-ordinate of said indication.

5. A wave-signal direction-indicating apparatus comprising: only three wave-signal interceptors positioned at the points of a right triangle for developing from a wave signal intercepted by each thereof three signals having relative phases representative of the phase gradients of said intercepted signal with reference to two non-opposite directions, two of said interceptors being equally spaced from the other thereof and at a distance from said other interceptor less than one-half the wave length of said intercepted signal; a cathode-ray tube coupled to said interceptors and having a control electrode-cathode circuit and a display screen for providing thereon effectively a dot indication of said intercepted signal; a control circuit including said control electrode-cathode circuit and coupled to only a first of said interceptors and responsive to a first of said three signals; a first control means for said cathode-ray tube coupled to only a second of said interceptors and responsive to a second of said three signals substantially simultaneously with the response of said control circuit and effective therewith to determine one co-ordinate of said indication; and a second control means for said cathode-ray tube coupled to only a third of said interceptors and responsive to a third of said three signals substantially simultaneously with the response of said control circuit and effective therewith to determine another co-ordinate of said indication.

6. A wave-signal direction-indicating apparatus comprising: only three wave-signal interceptors for developing from a wave signal intercepted thereby three signals having relative phases representative of the phase gradients of said intercepted signal with reference to two non-opposite directions; a cathode-ray tube coupled to said intercetpors and having a control electrode-cathode circuit and a display screen for providing thereon effectively a dot indication of said intercepted signal; a control circuit including said control electrode-cathode circuit and coupled to only a first of said interceptors and responsive to a first of said three signals; a first control means for said cathode-ray tube coupled to only a second of said interceptors and responsive to a second of said three signals substantially simultaneously with the response of said control circuit and effective therewith to determine one co-ordinate of said indication; and a second control means for said cathode-ray tube coupled to only a third of said interceptors and responsive to a third of said three signals substantially simultaneously with the response of said control circuit and effective therewith to determine another co-ordinate of said indication.

7. A wave-signal direction-indicating apparatus comprising: only three wave-signal interceptors for developing from a wave signal intercepted thereby three signals having relative phases representative of the phase gradients of said intercepted signal with reference to two non-opposite directions; a normally nonconductive cathode-ray tube coupled to said interceptors and having a control electrode-cathode circuit and a display screen for providing thereon effectively a dot indication of said intercepted signal; a control circuit including said control electrode-cathode circuit and coupled to only a first of said interceptors and responsive to a first of said three signals for periodically rendering said cathode-ray tube conductive to develop said indication; a first control means for said cathode-ray tube coupled to only a second of said interceptors and responsive to a second of said three signals and effective with said control circuit to determine one co-ordinate of said indication; and a second control means for said cathode-ray tube coupled to only a third of said interceptors and responsive to a third of said three signals and effective with said control circuit to determine another co-ordinate of said indication.

8. A wave-signal direction-indicating apparatus comprising: only three wave-signal interceptors for developing from a wave signal intercepted thereby three signals having relative phases representative of the phase gradients of said intercepted signal with reference to two non-opposite directions; a normally nonconductive cathode-ray tube coupled to said interceptors and having a control electrode-cathode circuit and a display screen for providing thereon effectively a dot indication of said intercepted signal; a pulse generator coupled to said control electrode-cathode circuit and coupled to only a first of said interceptors and responsive to a first of said three signals for generating repetitive pulses synchronized with said first signal which periodically render said cathode-ray tube conductive to develop said indication; a first control means for said cathode-ray tube coupled to only a second of said interceptors and responsive to a second of said three signals and effective with said pulse generator to determine one co-ordinate of said indication; and a second control means for said cathode-ray tube coupled to only a third of said interceptors and responsive to a third of said three signals and effective with said pulse generator to determine another co-ordinate of said indication.

9. A wave-signal direction-indicating apparatus comprising: only three wave-signal interceptors for developing from a wave signal intercepted thereby three signals having relative phases representative of the phase gradients of said intercepted signal with reference to two non-oppoiste directions; a normally nonconductive cathode-ray tube including a display screen and including a control electrode-cathode circuit so coupled to only a first of said interceptors as in response to a first of said three signals periodically to render said tube conductive and provide a cathode-ray beam which develops on said screen effectively a dot indication of said intercepted signal; a first beam-deflection circuit for said cathode-ray tube coupled to only a second of said interceptors and responsive to a second of said three signals for deflecting said beam along one of a pair of co-ordinate axes on said screen and effective with said control electrode-cathode circuit to determine one co-ordinate of said indication; and a second beam-deflection circuit for said cathode-ray tube coupled to only a third of said interceptors and responsive to a third of said three signals for deflecting said beam along the other of said co-ordinate axes and effective with said control electrode-cathode circuit to determine another co-ordinate of said indication.

10. A wave-signal direction-finding apparatus comprising: only three wave-signal interceptors for developing from a wave signal intercepted thereby three signals having relative phases representative of the phase gradients of said intercepted signal with reference to two non-opposite directions; a normally nonconductive cathode-ray tube including a display screen, means including a control electrode-cathode circuit for providing a cathode-ray beam which develops on said screen effectively a dot indication of said intercepted signal, one pair of beam-deflection electrodes for deflecting said cathode-ray beam along one of a pair of co-ordinate axes on said screen and another pair of beam-deflection electrodes for deflecting said cathode-ray beam along the other of said co-ordinate axes; a first pulse generator coupled to said control electrode-cathode circuit and to only a first of said interceptors and responsive to a first of said three signals for periodically rendering said cathode-ray tube conductive to provide said cathode-ray beam; a second pulse generator coupled to said one pair of beam-deflection electrodes and to only a second of said interceptors and responsive to a second of said three signals and effective with said first pulse generator to determine one co-ordinate of said indication; a third pulse generator coupled to said other pair of beam-deflection electrodes and to only a third of said interceptors and responsive to a third of said three signals and effective with said first pulse generator to determine another co-ordinate of said indication; and three wave-signal translating circuits individually coupled between said three interceptors and said three pulse generators for providing equal time delays in the translation of said three signals for said interceptors to said pulse generators.

11. A signal-separating apparatus for separating wave signals having approximately the same frequency and comprising pulses of wave-signal energy which arrive at said apparatus at different times over different wave-signal propagation paths comprising: only three wave-signal interceptors for developing from each of said wave signals intercepted thereby three signals having relative phases representative of the phase gradients of said each intercepted signal with reference to two non-opposite directions; a cathode-ray tube coupled to said interceptors and having a control electrode-cathode circuit and a display screen for providing thereon effectively a different dot indication of said each intercepted signal; a control circuit including said control electrode-cathode circuit and coupled to only a first of said interceptors and responsive to a first of said three signals developed from said each intercepted signal; a first control means for said cathode-ray tube coupled to only a second of said interceptors and responsive to a second of said three signals developed from said each intercepted signal substantially simultaneously with the response of said control circuit and effective therewith to determine one co-ordinate of each of said indications; and a second control means for said cathode-ray tube coupled to only a third of said interceptors and responsive to a third of said three signals developed from said each intercepted signal substantially simultaneously with the response of said control circuit and effective therewith to determine another co-ordinate of said each indication.

12. A signal-separating apparatus for separating wave signals having approximately the same frequency and comprising modulated pulses of wave-signal energy which arrive at said apparatus at different times over different wave-signal propagation paths comprising: a wave-signal intercepting system for developing from each of said wave signals intercepted thereby at least three signals having relative phases representative of the phase gradients of said each intercepted signal with reference to at least two non-opposite directions; display means coupled to said system and including a single display area for providing thereon effectively a different dot indication of said each intercepted signal, a control circuit responsive to at least a first of said three signals developed from said each intercepted signal, a first control means responsive to at least a second of said three signals developed from said each intercepted signal substantially simultaneously with the response of said control circuit and effective therewith to determine one co-ordinate of each of said indications, and a second control means responsive to at least a third of said three signals developed from said each intercepted signal substantially simultaneously with the response of said control circuit and effective therewith to determine another co-ordinate of said each indication; a signal-translating channel coupled to said intercepting system for translating a selected one of said intercepted signals and for reproducing the modulation components thereof but normally maintained in a nontranslating condition; and a gating-pulse generator circuit coupled to said channel and responsive to said selected signal for conditioning said channel to translate said selected signal and reproduce the moduation components thereof.

13. A signal-separating apparatus for separating wave signals having approximately the same frequency and comprising amplitude-modulated pulses of wave-signal energy which arrive at said apparatus at different times over different wave-signal propagation paths comprising: a wave-signal intercepting system for developing from each of said wave signals intercepted thereby at least three signals having relative phases representative of the phase gradients of said each intercepted signal with reference to at least two nonopposite directions; display means coupled to said system and including a single display area for providing thereon effectively a different dot indication of said each intercepted signal, a control circuit responsive to at least a first of said three signals developed from said each intercepted signal, a first control means responsive to at least a second of said three signals developed from said each intercepted signal substantially simultaneously with the response of said control circuit and effective therewith to determine one coordinate of each of said indications, and a second control means responsive to at least a third of said three signals developed from said each intercepted signal substantially simultaneously with the response of said control circuit and effective therewith to determine another co-ordinate of said each indication; a signal-translating channel coupled to said intercepting system for translating a selected one of said intercepted signals and for reproducing the modulation components thereof and including a repeater normally maintained in a nontranslating condition; and a gating-pulse generator circuit, coupled to said channel and including a photoelectric device responsive to the dot indication of said selected signal, for conditioning said repeater to translate said selected signal and reproduce the modulation components thereof.

References Cited in the file of this patent

UNITED STATES PATENTS

| | | |
|---|---|---|
| 2,406,953 | Lewis | Sept. 3, 1946 |
| 2,408,118 | Wirkler | Sept. 24, 1946 |
| 2,415,955 | Luck | Feb. 18, 1947 |
| 2,428,427 | Loughren | Oct. 7, 1947 |
| 2,437,695 | Jansky | Mar. 16, 1948 |